United States Patent [19]
Bergman

[11] Patent Number: 5,791,429
[45] Date of Patent: Aug. 11, 1998

[54] SNOWMOBILE TUNNEL WITH BI-SURFACED TOP

[76] Inventor: Ronald H. Bergman, Rte. 1, Box 108, McIntosh, Minn. 56556

[21] Appl. No.: 832,651

[22] Filed: Apr. 4, 1997

Related U.S. Application Data

[63] Continuation of Ser. No. 525,821, Sep. 8, 1995, abandoned.

[51] Int. Cl.$^6$ .................................................. B62M 27/02
[52] U.S. Cl. ........................ 180/193; 180/9.5; 180/190
[58] Field of Search ............................ 180/182, 186, 180/190, 191, 192, 193, 9.5, 89.1

[56] References Cited

U.S. PATENT DOCUMENTS

| | | | |
|---|---|---|---|
| 3,690,394 | 9/1972 | Skime | 180/193 X |
| 3,830,323 | 8/1974 | Vuolevi | 180/193 |
| 4,146,101 | 3/1979 | Plourde | 180/190 |
| 4,768,794 | 9/1988 | Bibollet | 180/190 X |
| 4,779,695 | 10/1988 | Yasui | 180/190 |

OTHER PUBLICATIONS

Arctco, Inc., Illus.Parts Manual—1973 El Tigre, p. 8.
Arctco, Inc., Illus.Parts Manual—1989 Jag, p. 10.
Arctco, Inc., Illus.Parts Manual—1991 Jag, p. 13.
Arctco, Inc., Illus.Parts Manual—1993 Lynx, p. 17.
Arctco, Inc., Illus.Parts Manual—1995 ZR 440, pp. 25–26.
Supertrax Int'l—Fall 1995—p. 40.
Race & Rally—Winter '95–'96, pp. 68–69.

*Primary Examiner*—Daniel G. DePumpo

[57] ABSTRACT

A tunnel body for a snowmobile, with a cooperating seat cushion, which provides greater space within the tunnel body to accommodate extended travel of the rear suspension, including the rear idler wheels and track, when the rear suspension is subjected to a large rise or bump. This is accomplished without raising the height of the snowmobile rider, thus improving handling.

4 Claims, 7 Drawing Sheets

SNOWMOBILE TUNNEL WITH BI-SURFACED TOP

This application is a continuation of application Ser. No. 08/525,821, filed Sept. 8, 1995, now abandoned.

BACKGROUND

The present invention relates to a snowmobile, more particularly to a tunnel body for a snowmobile, and its cooperating seat cushion, which provides greater space within the tunnel body to accommodate extended travel of the rear suspension, including the rear idler wheels and track of the snowmobile, when the rear suspension is subjected to a large rise or bump. This is accomplished without raising the height of the snowmobile rider so that the center of gravity of the snowmobile/rider combination is not raised, the permitted greater travel distance of the track and track suspension improving the handling of the snowmobile.

Under currently known design of snowmobiles, and their tunnel bodies in particular, the snowmobile tunnel body provides adequate clearance for all components of the rear suspension system only when the front suspension arms and the rear suspension arms are collapsed equally. Under those circumstances, the rear arm cross tube contacts the skid frame of the snowmobile while there is still clearance between the underside of the snowmobile tunnel body and the track which wraps around the rear idler wheels. However, when the rear suspension arms are collapsed a greater amount than the front suspension arms, such as when the snowmobile lands in such a way that the rear arm of the suspension has to absorb the entire bump, the rear idler wheels, surrounded by the track, contact the underside of the tunnel body before the rear arm cross tube contacts the skid rail. When the prior art snowmobile lands on only its rear suspension arm the rider gets the cushioning effect of only the rear shock absorber and spring and the snowmobile bottoms out sooner than if the snowmobile had landed on only the front suspension arm, or on the front and rear suspension arms equally.

This invention provides a snowmobile tunnel body having clearance between the underside of the tunnel body and the track surrounding the rear idler wheels under extreme conditions of suspension action. An advantage of this invention is that it provides this additional travel of the rear suspension without changing the elevation of the rider in relation to the ground surface, and without raising the center of gravity of the rider/snowmobile combination, thus maintaining the handling benefits achieved by a lower center of gravity. Another advantage of this invention is that it provides consistent response of the rear suspension, avoiding early "bottoming out", thus providing increased rider comfort. These and other objects of the invention will be apparent to those skilled in the art from the following detailed description of a preferred embodiment of the invention.

SUMMARY OF THE INVENTION

The present invention provides a tunnel body for a snowmobile. The tunnel body has a substantially horizontal first surface with a length sufficient to permit seating of a rider. The tunnel body also has a second surface extending substantially rearwardly and upwardly from the first surface. Extending downwardly from the sides of the first and second surfaces are two side surfaces. The side surfaces contain mountings, either bearings, bushings, or other suitable mountings, to retain the cross tubes of the track suspension system, thus maintaining the track suspension system and the track within the lateral confines of the tunnel body.

The seat cushion of the snowmobile cooperates with the tunnel body to retain seating comfort without increasing the height of the rider above the ground. Because the forward sections of the tunnel body and the seat cushion are substantially horizontal as far back as the rider is seated, the seated rider remains at the same height above the ground as he would on a snowmobile not having the tunnel body of this invention. Thus this invention provides the advantages of extended travel for the rear suspension arms without increasing the rider's elevation, the permitted greater travel distance of the track and track suspension thereby improving the handling of the snowmobile.

BRIEF DESCRIPTION OF THE DRAWINGS

The invention will be further described in connection with the accompanying drawings, in which.

DETAILED DESCRIPTION OF THE INVENTION

Figure 1:
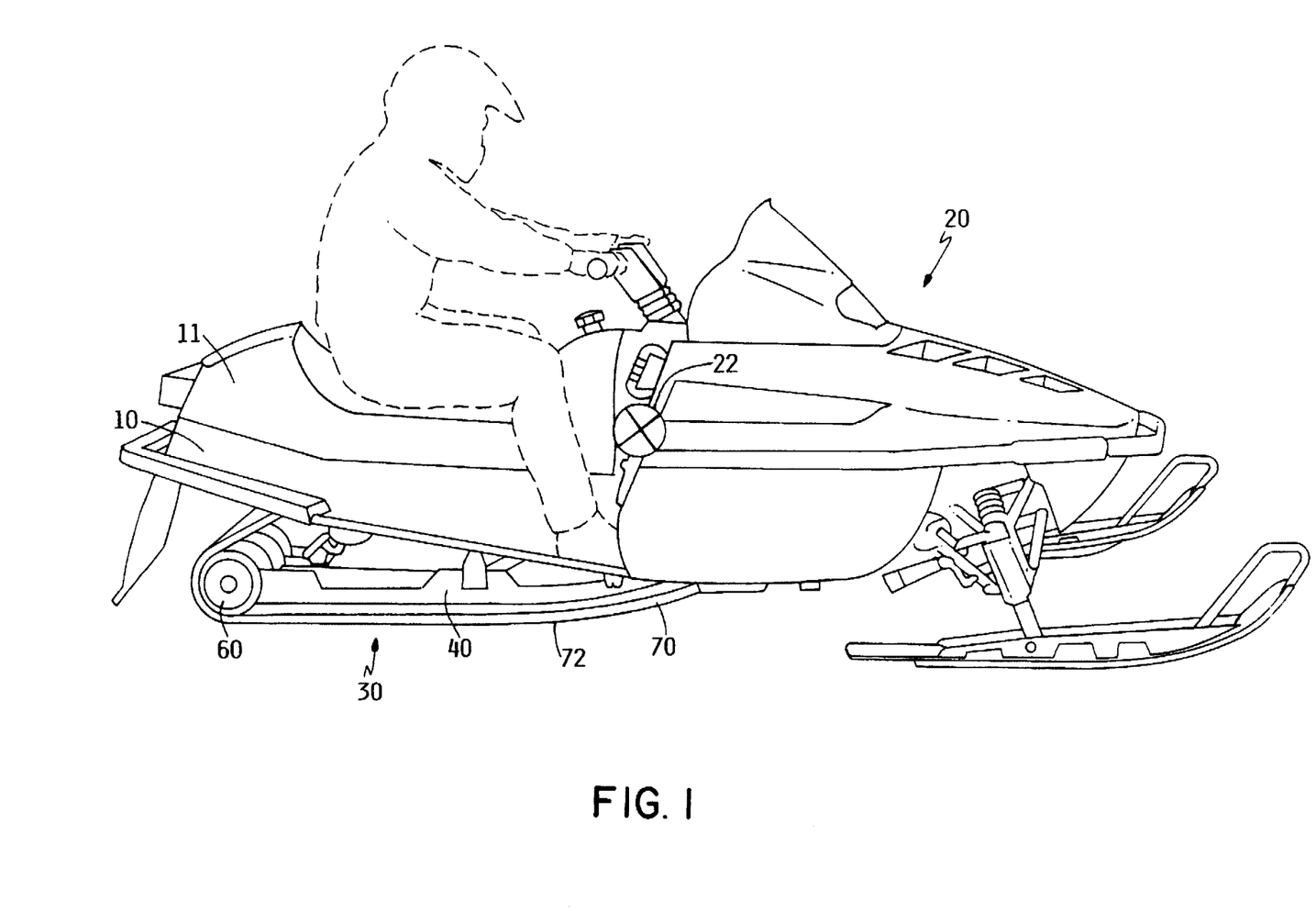
FIG. 1 is a side elevation view of a snowmobile having the invention tunnel with bi-surfaced top and cooperating seat cushion.

With reference to the drawings, like reference numbers designate like or corresponding parts throughout the several views. The snowmobile tunnel body 10 of the invention is shown in relation to the snowmobile 20 in FIG. 1. FIG. 1 depicts (in dashed lines) the normal sitting position of a rider on the seat cushion 11 of snowmobile 20. The center of gravity of the snowmobile/rider combination is shown as number 22. Also shown on FIG. 1 are the skid frame 40 the rear idler wheels 60, the track 70, and the outer surface of the track 72 contacting the ground. These components comprise the track suspension system 30.

Figure 2:
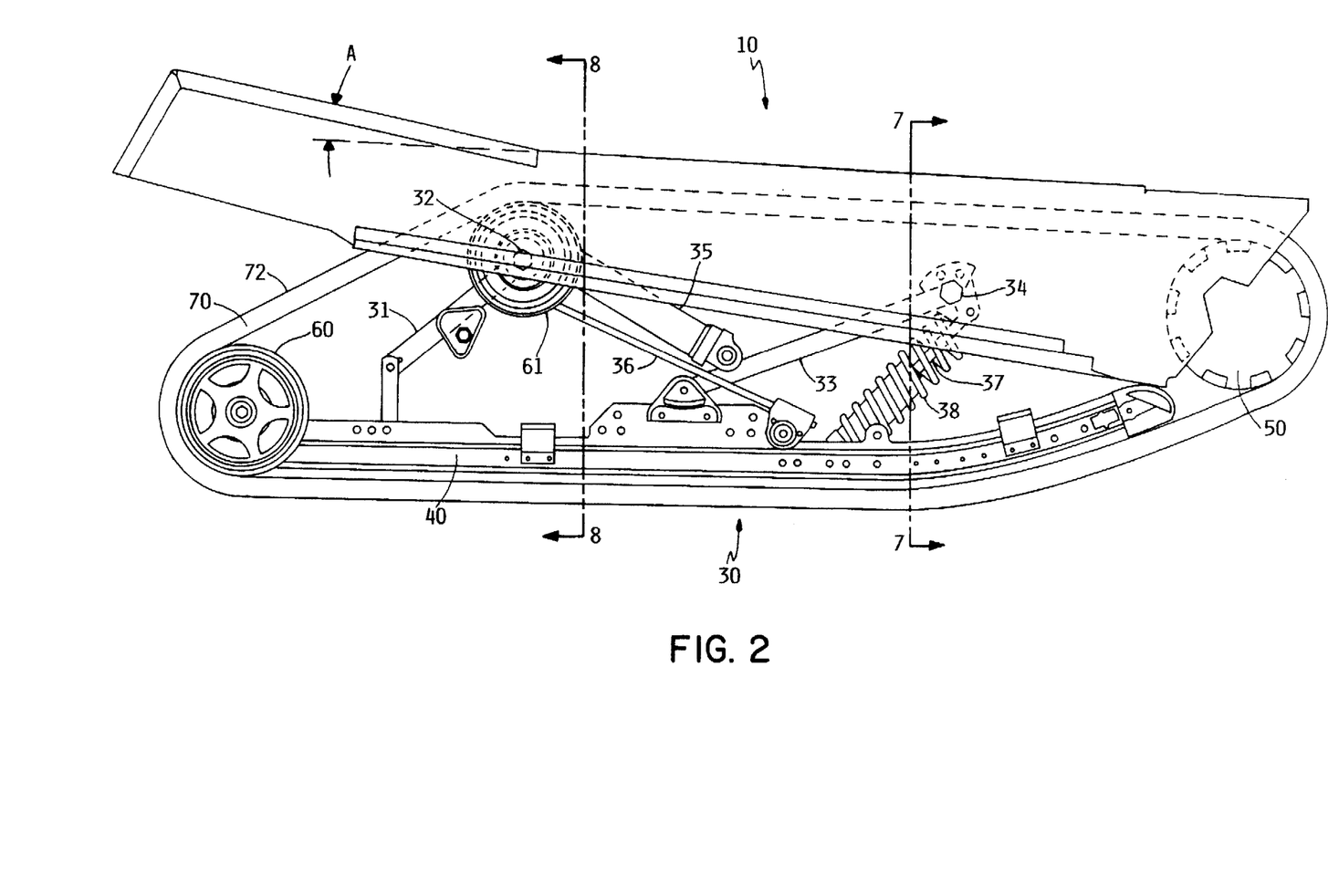
FIG. 2 is a side elevation view of the invention tunnel over critical portions of the track suspension system of the snowmobile of FIG. 1. It shows the relation of the components when the track suspension system is fully extended, as it would be when the snowmobile is at rest as shown in FIG. 1.

Portions of the track suspension system 30, the drive wheel 50, the track 70, and the tunnel body 10 of the snowmobile 20 are shown in FIG. 2. FIG. 2 depicts a rear suspension arm 31 connected to the skid frame 40 and to the rear arm cross tube 32. The rear arm cross tube 32 extends from one side of the track suspension system 30 to the other.

The suspension springs 36 fit over the rear arm cross tube 32 and extend between the rear suspension arms 31 and the skid frame 40. The rear suspension arms 31, the rear arm cross tube 32, the rear arm shock absorber 35, and the suspension spring 36 comprise the rear suspension. FIG. 2 also shows one of the drive wheels 50 and one of the rear idler wheels 60 connected to the skid frame 40. Also connected to the skid frame 40 is a front suspension arm 33 and a front arm cross tube 34. The front arm cross tube 34 extends from one side of the track suspension system 30 to the other. FIG. 2 also shows the front arm shock absorber 37 and front arm spring 38. The rear arm shock absorber 35, the suspension spring 36, and the front arm shock absorber 37 and front arm spring 38 act to bias the rear and front suspension arms 31 and 33 away from the tunnel body 10. They also thus bias the track 70 downwardly from the tunnel body 10. FIG. 2 depicts portions of the track suspension system in a fully extended condition; under this condition the track 70 is supported by the rear idler wheels 60 and the front idler wheels 61 as it is driven by the drive wheels 50. During operation of the snowmobile 20, loading of the track suspension system 30 by acceleration or deceleration of the snowmobile 20, and by the snowmobile's encountering rises and bumps, causes the front arm cross tube 34 and/or the rear arm cross tube 32 to move toward the skid frame 40.

Figure 3:
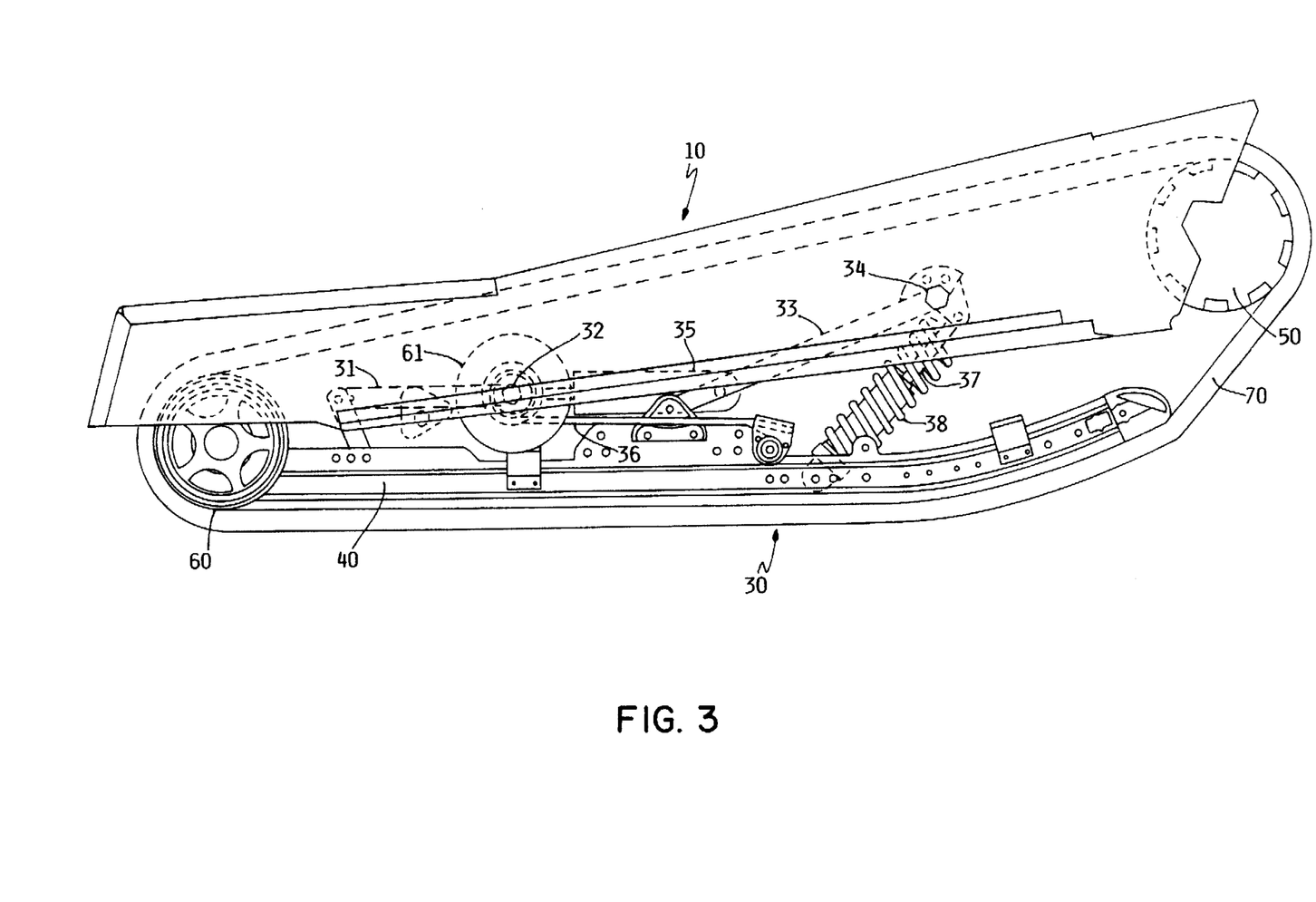
FIG. 3 is a side elevation view of the invention tunnel over critical portions of the track suspension system of the snowmobile of FIG. 1, showing the relation of the components when the rear suspension arms of the track suspension system are partially collapsed and the front suspension arms remain elevated.

FIG. 3 depicts the relationship between the track suspension system 30, the track 70, and the tunnel body 10 when the one or more rear suspension arms 31 are partially collapsed and the one or more front suspension arms 33 remain elevated. FIG. 3 also depicts the amount of track suspension system travel permitted by the prior art. Under this condition the rear arm cross tube 32 does not contact the skid frame 40 and the track 70 is supported by the rear idler wheels 60 as it is driven by the drive wheels 50. In the prior art the track 70 and the rear idler wheels 60 would hit the underside of the prior art tunnel body before the rear arm cross tube 32 hit the skid frame 40.

Figure 4:
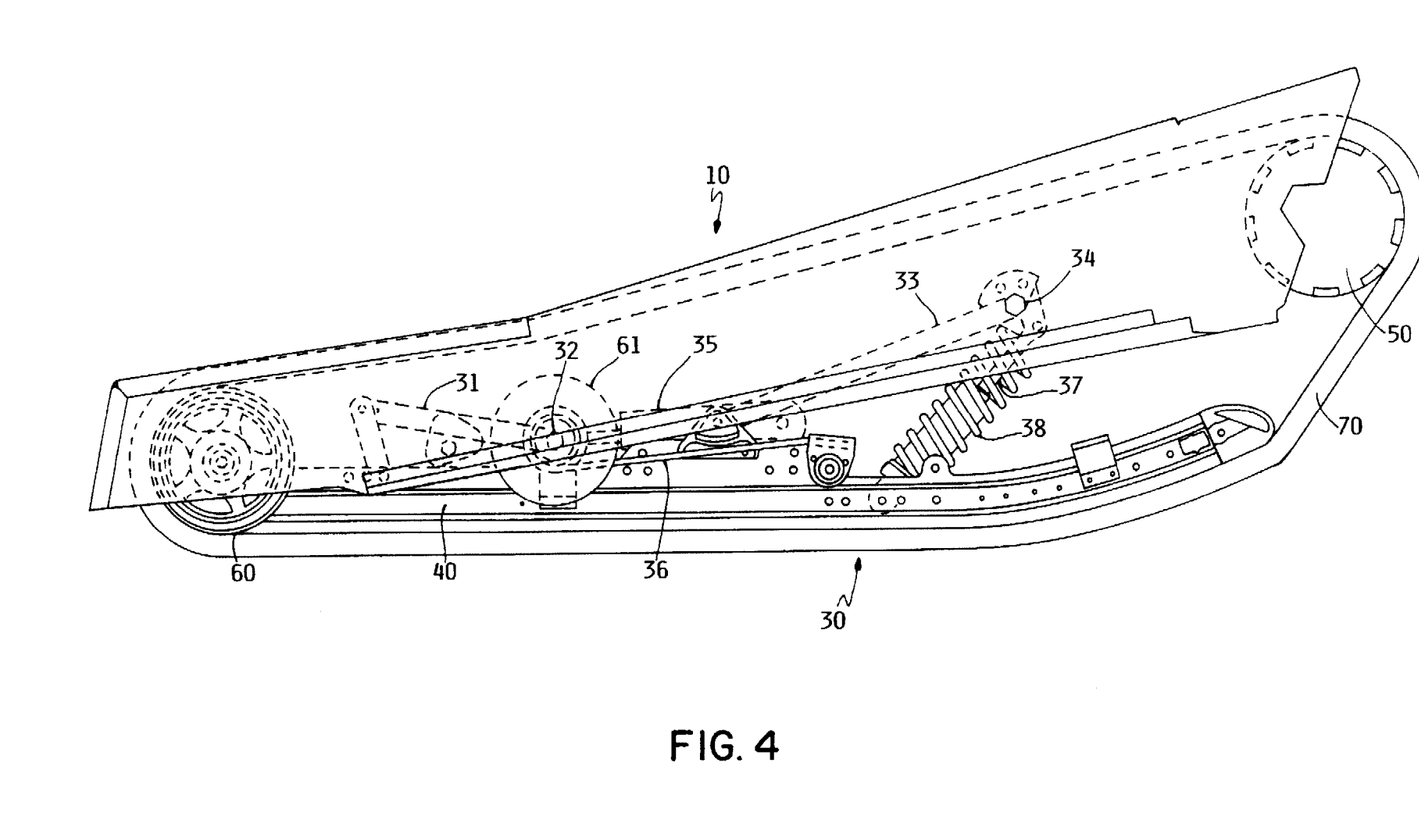
FIG. 4 is a side elevation view of the invention tunnel over critical portions of the track suspension system of the snowmobile of FIG. 1, showing the relation of the components when the rear suspension arms of the track suspension system are fully collapsed and the front suspension arms remain elevated.

FIG. 4 depicts the relationship between the track suspension system 30, the track 70, and the tunnel body 10 when the rear suspension arms 31 are fully collapsed and the front suspension arms 33 remain elevated. Under these circumstances the rear arm cross tube 32 contacts the skid frame 40 while there is still clearance between the outer surface 72 of the track 70 and the tunnel body 10. Thus it is seen that this invention permits extended travel of the track suspension system over that of the prior art.

Figure 5:
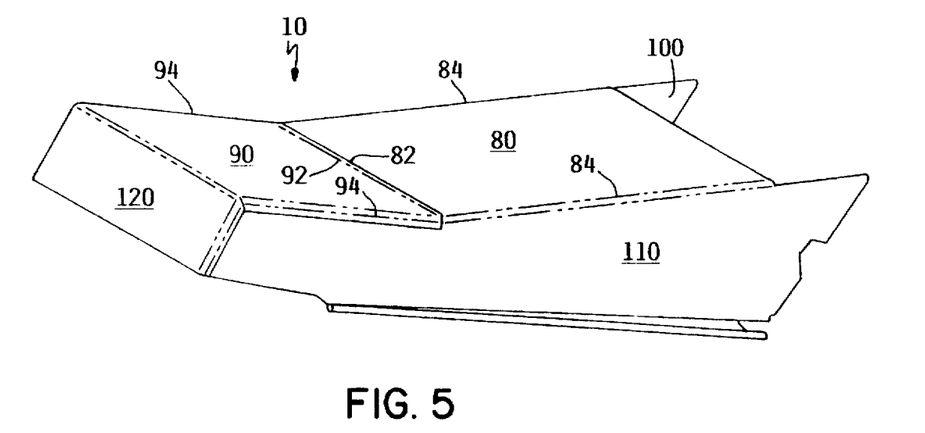
FIG. 5 is a perspective view of the invention tunnel.

FIG. 5 depicts the snowmobile tunnel body 10 of the invention. In the preferred embodiment the tunnel body 10 is made of aluminum, but could also be made of any other suitable material, which will be apparent to one skilled in the art. The tunnel body 10 has a first surface 80 with rearward edge 82 and side edges 84. Said first surface 80 is substantially horizontal and is long enough to permit seating of a rider thereon, which length will be apparent to one skilled in the art.

The second surface 90 of the snowmobile tunnel body 10 extends substantially rearwardly and upwardly from the rearward edge 82 of the first surface 80; the forward edge 92 of the second surface 90 is attached to the rearward edge 82 of the first surface 80 by rivets or by any other suitable means, such as adhesive, which will be apparent to one skilled in the art. The second surface 90 has side edges 94. The second surface 90 slopes upward at an angle sufficient to provide clearance between the outer surface 72 of the track 70 and the underside of the second surface 90 when the rear arm cross tube 32 contacts the skid frame 40 while the front arm cross tube 34 remains elevated. In the preferred embodiment the angle "A", as shown in FIG. 2, between the second surface 90 and the extension of the first surface 80 is approximately 8.75 degrees. However, other angles between 5 and 20 degrees could be used without departing from the teachings of this invention.

The snowmobile tunnel body 10 also has first and second sides 100 and 110 which extend downwardly from the first and second surfaces. They are attached to the side edges 84 and 94 of the first and second surfaces 80 and 90 respectively by rivets, or by any other suitable means, such as adhesive, which will be apparent to one skilled in the art. Each of the first and second sides 100 and 110 has an inner and an outer surface, the inner surface facing the inside of the tunnel body and the outer surface facing the outside. The outer surface of the second side 110 is shown in FIG. 5, as is the inner surface of first side 100. The sides 100 and 110 contain mountings, either bearings, bushings, or other suitable mountings, to retain the rear arm cross tube 32 and the front arm cross tube 34 of the track suspension system 30, thus maintaining the track suspension system 30 and the track 70 within the lateral confines of the tunnel body 10.

The snowmobile tunnel body 10 may also have a third side 120 attached to the rearward edge of the second surface 90 by rivets or by any other suitable means, such as adhesive, which will be apparent to one skilled in the art.

The rear arm cross tube 32 is attached to the inner surface of the first side 100 and to the inner surface of the second side 110 of the tunnel body 10 by bearings, bushings, or any other suitable means which will be apparent to one skilled in the art.

The front arm cross tube 34 is also attached to the inner surface of the first side 100 and to the inner surface of the second side 110 of the tunnel body 10 by bearings, bushings, or any other suitable means which will be apparent to one skilled in the art.

As shown in FIG. 1, the bottom surface of the seat cushion 11 follows the contour of the first surface 80 and the second surface 90 of the tunnel body 10. However, because the forward sections of the tunnel body 10 and the seat cushion 11 are substantially horizontal as far back as the rider is seated, the seated rider remains at the same height above the ground as he would on a snowmobile not having the tunnel body 10 of this invention, thus retaining the center of gravity 22 of the snowmobile/rider combination and improving handling of the snowmobile.

Figure 6:
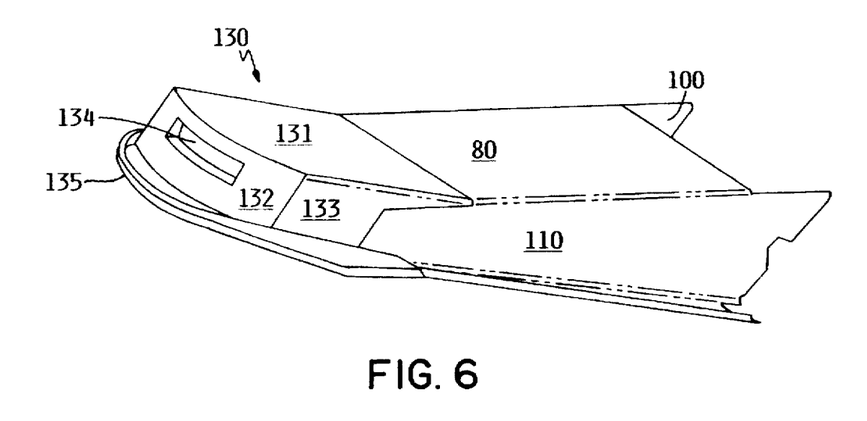
FIG. 6 is a perspective view of an alternative embodiment of the invention tunnel in which the rear portions of the tunnel body are integrally molded.
Figure 7:
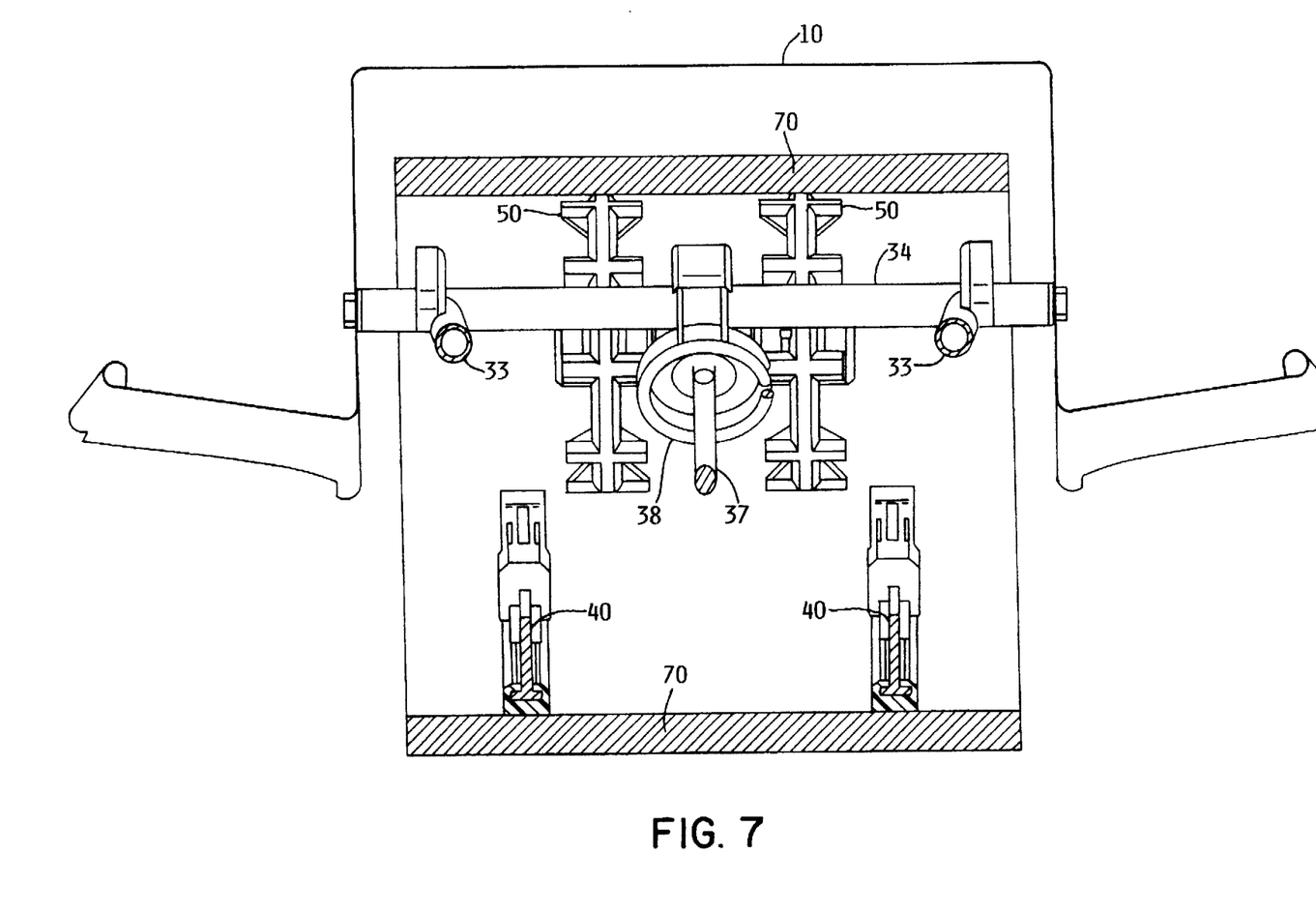
FIG. 7 is a cross-sectional view of the front portion of the invention tunnel taken at Section 7—7 of FIG. 2.
Figure 8:
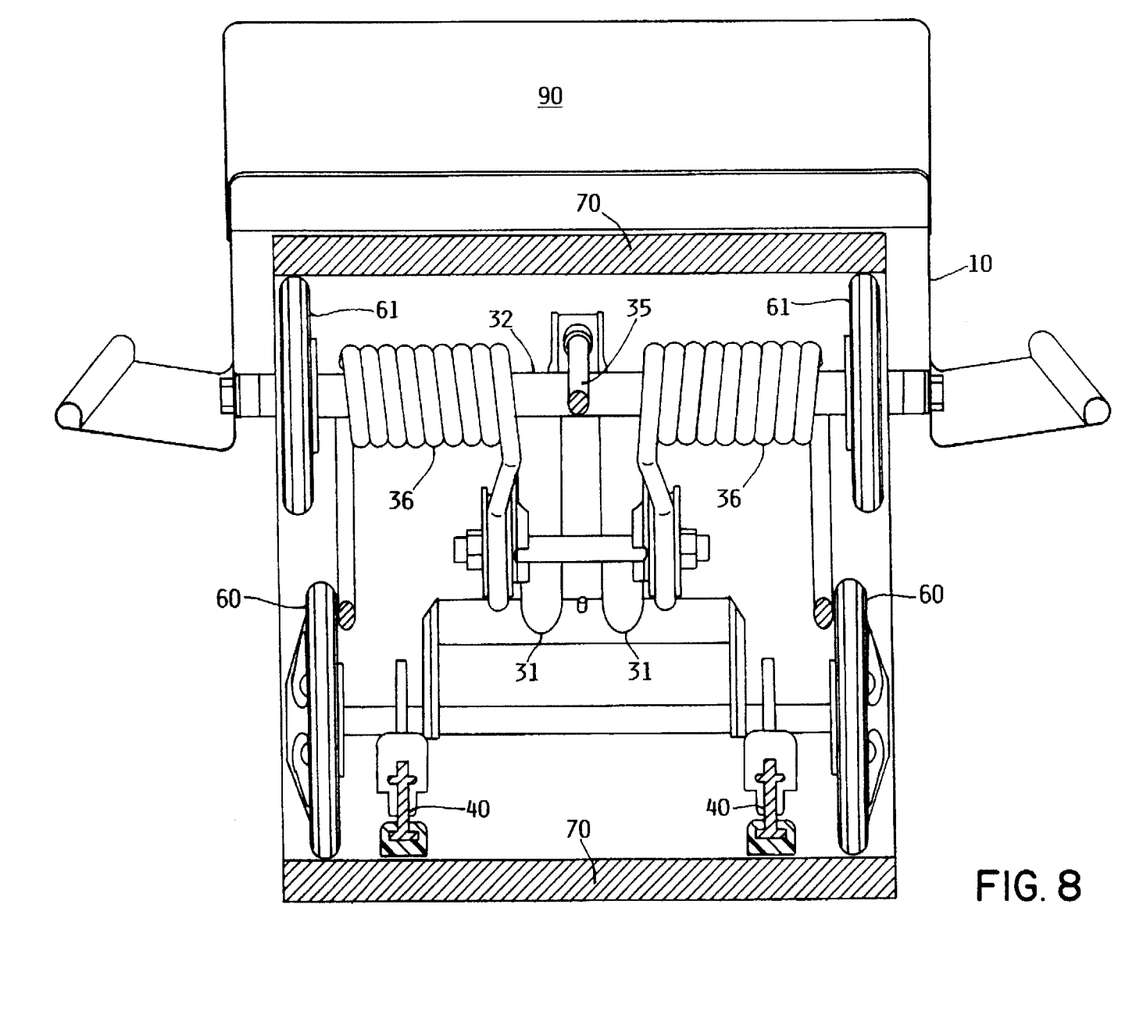
FIG. 8 is a cross-sectional view of the rear portion of the invention tunnel taken at Section 8—8 of FIG. 2.

FIG. 6 depicts an alternative embodiment molded section 130 of the subject invention. In the preferred embodiment the molded section 130 is made of a plastic material such as high density polyurethane, but could also be made of any other suitable material, which will be apparent to one skilled in the art. In this embodiment, the rear portions of the tunnel body 10, including top portion 131, rear portion 132, and side portions 133, are integrally molded in one piece and subsequently attached to the front portions of the tunnel body by any suitable means such as rivets or adhesive; other means of attachment will also be apparent to one skilled in the art. Said molded section 130 might also incorporate one or more recessed pockets 134 for lights, reflectors, or other features, and a bumper 135. The recessed pockets for lights and/or reflectors protect them from damage on the trail both by safeguarding the lights and reflectors and by eliminating protrusions. The molded section, being made of molded plastic type material, will also have radiused corners and smooth transitions which will minimize snow buildup on the machine, and thus improve handling of the snowmobile.

Thus it is seen that this invention provides a snowmobile tunnel body having clearance between the underside of the tunnel body and the track surrounding the rear idler wheels even under conditions where the rear suspension arm 31 is fully collapsed. An advantage of this invention is that it provides this additional clearance without changing the elevation of the rider in relation to the ground surface and without raising the center of gravity of the rider/snowmobile combination, thus maintaining the handling benefits achieved by a lower center of gravity. It is seen that this invention also allows consistent response of the rear suspension, avoiding early "bottoming out", and thus providing greater control for the operator. An additional benefit of this invention is, thus providing increased rider comfort. These benefits to the operator are felt when riding on uneven terrain and when the snowmobile transfers weight to the rear suspension arms during acceleration of the snowmobile.

While a preferred form of the invention has been shown in the drawings and described, since variations in the preferred form will be apparent to those skilled in the art, the invention should not be construed as limited to the specific form shown and described, but instead is as set forth in the following claims.

I claim:

1. In a snowmobile having a track and a track suspension system including front suspension arms, rear suspension arms, idler wheels, shock absorbers, and springs, a snowmobile tunnel body having
 (1) a forward generally horizontal first top surface,
 (2) a second top surface extending rearwardly and upwardly from said first top surface,
 (3) first and second generally vertical sides extending downwardly from said first and second surfaces,
 (4) said second top surface and said first and second sides of said tunnel body cooperating to define a rear tunnel recess,
 (5) front suspension arms pivotally connected to said first and second sides of said tunnel body to provide front pivotable supports of the track suspension system within said tunnel body,
 (6) rear suspension arms pivotally connected to said first and second sides of said tunnel body to provide rear pivotable supports of the track suspension system within said tunnel, wherein said shock absorbers and springs bias the track downwardly from the tunnel body, and wherein said rear suspension arms, idler wheels, and track are located within said tunnel body below said second top surface so that when said rear suspension arms are fully rotated upward about the rear pivotable supports, the idler wheels and the track extend upward into the rear tunnel recess, thereby permitting extended travel of said rear suspension arms, providing consistent response of the track suspension to avoid unexpected bottoming out, and giving improved control and comfort to the rider.

2. The snowmobile tunnel body of claim 1, wherein the first and second sides which depend from the second top surface are integral therewith and made of plastic material.

3. In a snowmobile having a track and a track suspension system including front suspension arms, rear suspension arms, idler wheels, shock absorbers, and springs, a snowmobile tunnel body having
 (1) a forward generally horizontal first top surface,
 (2) a second top surface extending rearwardly and upwardly from said first top surface,
 (3) first and second generally vertical sides extending downwardly from said first and second surfaces,
 (4) said second top surface and said first and second sides of said tunnel body cooperating to define a rear tunnel recess,
 (5) front suspension arms pivotally connected to said first and second sides of said tunnel body to provide front pivotable supports of the track suspension system within said tunnel body,
 (6) rear suspension arms pivotally connected to said first and second sides of said tunnel body to provide rear pivotable supports of the track suspension system within said tunnel, wherein said shock absorbers and springs bias the track downwardly from the tunnel body, and wherein said rear suspension arms, idler wheels, and track are located within said tunnel body below said second top surface so that when said rear suspension arms are fully rotated upward about the rear pivotable supports, the idler wheels and the track extend upward into the rear tunnel recess, thereby permitting extended travel of said rear suspension, providing consistent response of the track suspension to avoid early bottoming out, and giving improved control and comfort to the rider.

4. The snowmobile tunnel body of claim 3, wherein the first and second sides which depend from the second top surface are integral therewith.

* * * * *